(12) United States Patent
Kline et al.

(10) Patent No.: US 7,116,883 B2
(45) Date of Patent: Oct. 3, 2006

(54) FIBER OPTIC PROTECTIVE CARRIER

(75) Inventors: James R. Kline, Petoskey, MI (US);
Thomas J. Kline, Petoskey, MI (US);
Dustin S. Sene, Emigrant, MT (US)

(73) Assignee: Fiber Optic Protection Systems, Inc.,
Wesley Chapel, FL (US)

( * ) Notice: Subject to any disclaimer, the term of this patent is extended or adjusted under 35 U.S.C. 154(b) by 0 days.

(21) Appl. No.: 11/251,995

(22) Filed: Oct. 17, 2005

(65) Prior Publication Data
US 2006/0110119 A1   May 25, 2006

Related U.S. Application Data

(60) Provisional application No. 60/629,545, filed on Nov. 19, 2004.

(51) Int. Cl.
*G02B 6/00* (2006.01)
(52) U.S. Cl. .................. 385/135; 385/137; 385/147
(58) Field of Classification Search ........ 385/134–137, 385/147
See application file for complete search history.

(56) References Cited

U.S. PATENT DOCUMENTS

| | | | |
|---|---|---|---|
| 6,349,893 B1* | 2/2002 | Daoud | 242/376 |
| 6,484,958 B1* | 11/2002 | Xue et al. | 242/378.1 |
| 6,533,206 B1* | 3/2003 | Ichinari et al. | 242/388.1 |
| 6,580,866 B1* | 6/2003 | Daoud et al. | 385/135 |
| 6,915,058 B1* | 7/2005 | Pons | 385/135 |
| 7,000,863 B1* | 2/2006 | Bethea et al. | 242/388.1 |
| 2002/0118944 A1* | 8/2002 | Burns et al. | 385/135 |
| 2003/0095773 A1* | 5/2003 | Ichinari et al. | 385/135 |
| 2005/0226588 A1* | 10/2005 | Pons | 385/135 |
| 2006/0045458 A1* | 3/2006 | Sasaki et al. | 385/135 |
| 2006/0093307 A1* | 5/2006 | Lowentat et al. | 385/147 |

* cited by examiner

*Primary Examiner*—Kevin S. Wood
(74) *Attorney, Agent, or Firm*—John K. McCulloch

(57) ABSTRACT

A protective carrier for a fiber optic cable comprises a casing within which is a rotor rotatable in a selected one of two opposite directions. The rotor supports the cable at the axis of rotation of the rotor and the cable extends in opposite directions from such axis and is guided to axially spaced peripheral grooves in which a major portion of the retracted cable is accommodated. From each of the grooves opposite ends of the cable extend through openings in the casing and are coupled to terminations by means of which the cable may be connected to terminals. The openings into the casing accommodate and shield the connectors. The casing is sufficiently rigid to protect the cable and terminations from damage. The path of movement of the cable into and out of the casing is such that the cable is not subjected to kinking or bending in such manner as to damage the cable or attenuate the signal carried by the cable.

11 Claims, 2 Drawing Sheets

FIBER OPTIC PROTECTIVE CARRIER

CROSS REFERENCE TO RELATED APPLICATION

Figure 1:
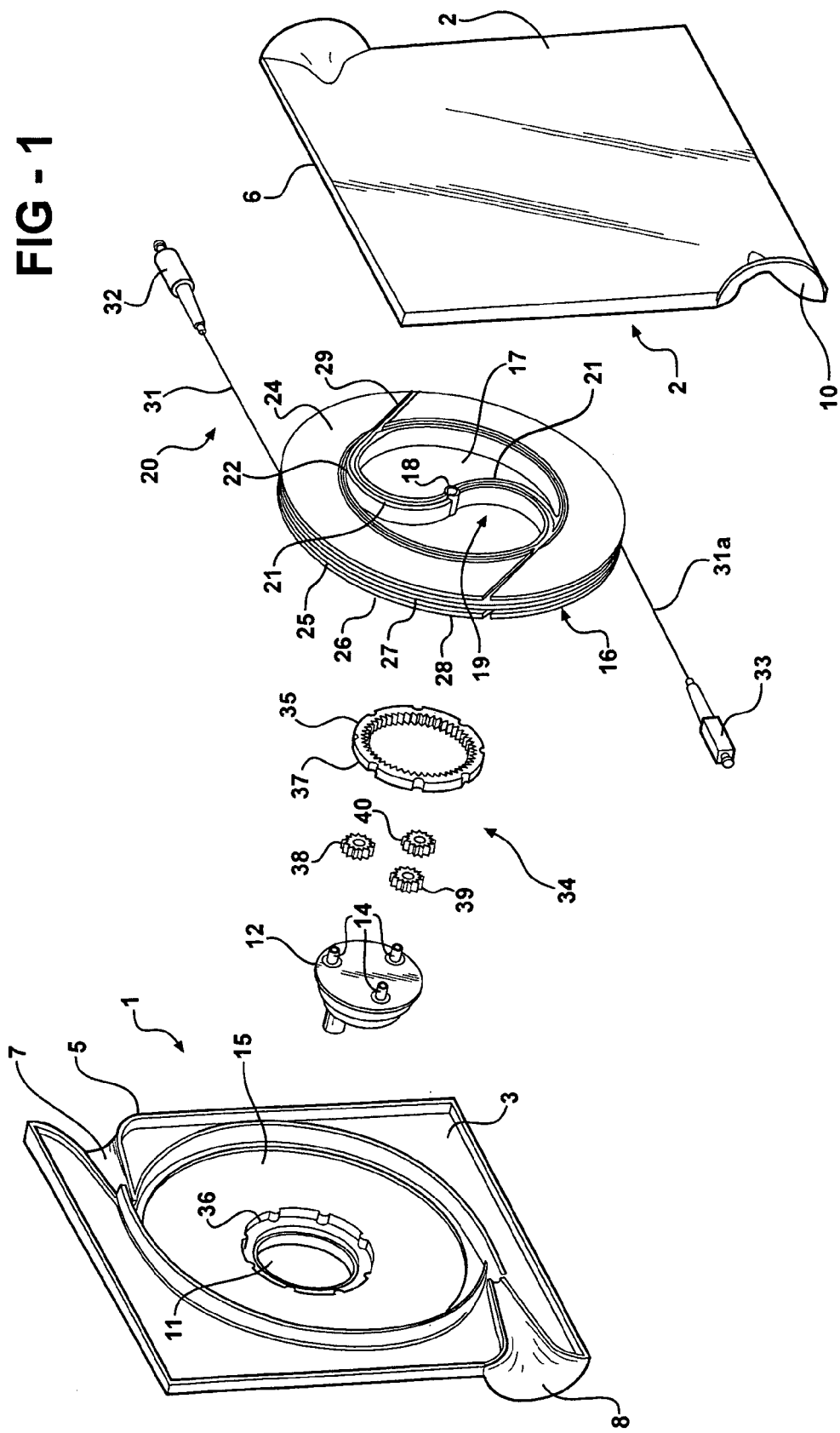

This application claims the benefit of the filing date of U.S. Provisional Application Ser. No. 60/629,545, titled FIBER OPTIC PROTECTIVE CARRIER, filed Nov. 19, 2004.

This invention relates to a protective carrier especially adapted for use in conjunction with a fiber optic cable.

BACKGROUND OF THE INVENTION

A fiber optic cable is used to provide for various reasons a signal path between spaced apart terminations. Conventional cables, when shipped, stored, or otherwise are not in use, are coiled and usually placed in flexible bags which, while providing some protection against dirt and moisture, provide virtually no protection against damage to the cable if it is subjected to conditions which cause damage to the cable. Among the conditions which cause damage to a cable are kinking the cable by bending it about a radius that is so small that the cable is curved to the extent that the signal carried by the cable is attenuated or the cable is permanently deformed. Other damage results from stepping on the cable, dropping the cable, or dropping another object on the cable.

A principal object of the invention is to provide a fiber optic protective carrier which overcomes such disadvantages.

SUMMARY OF THE INVENTION

A protective carrier according to the invention comprises a rigid, hollow casing formed of suitable, preferably plastic, material and within which is accommodated a rotor rotatable about an axis and having at its periphery two axially spaced grooves. A fiber optic cable is secured midway between its ends at the axis of rotation of the rotor and extends in opposite directions from such axis. One part of the cable extends from the axis in such direction as to be accommodated in one of the grooves of the rotor, whereas the other part of the cable extends from the axis in such direction as to occupy the other groove in the rotor. Those ends of the cable remote from the axis of rotation extend through openings in the casing and are joined to terminations by means of which the cable may be joined to terminations forming part of the fiber optic circuit.

Those portions of the cable which extend from the axis of rotation of the rotor to their respective openings in the casing occupy channels in the rotor which serve to guide the cable and prevent its becoming kinked or otherwise damaged due to being bent too sharply, i.e., on a radius so small as permanently to deform or break the cable or result in attenuation of the signal carried by the cable.

The rotor is of such diameter and the passages through which cable portions pass out of and into the casing are such that the cable portions between the periphery and the respective passages occupy a position substantially tangential to the rotor, thereby avoiding inappropriate bending of the cable at the zone at which the cable leaves the rotor, as well as at the zones where the cable joins the termination at the ends of the cable.

A crank mechanism is coupled to the rotor in such manner as to effect rotation in a selected one of two opposite directions so as to enable portions of the cable to be extended from and returned to the interior of the casing. The passages in the casing through which portions of the cable extend are of such size and shape as to accommodate the terminations at the ends of the cable, thereby providing protection for the terminations and the joint between them and the cable when the cable is not in use and preventing movement of the ends of the cable into the casing.

As used herein the term fiber optic cable or cable includes single and multiple strand constructions.

THE DRAWINGS

Figure 2:
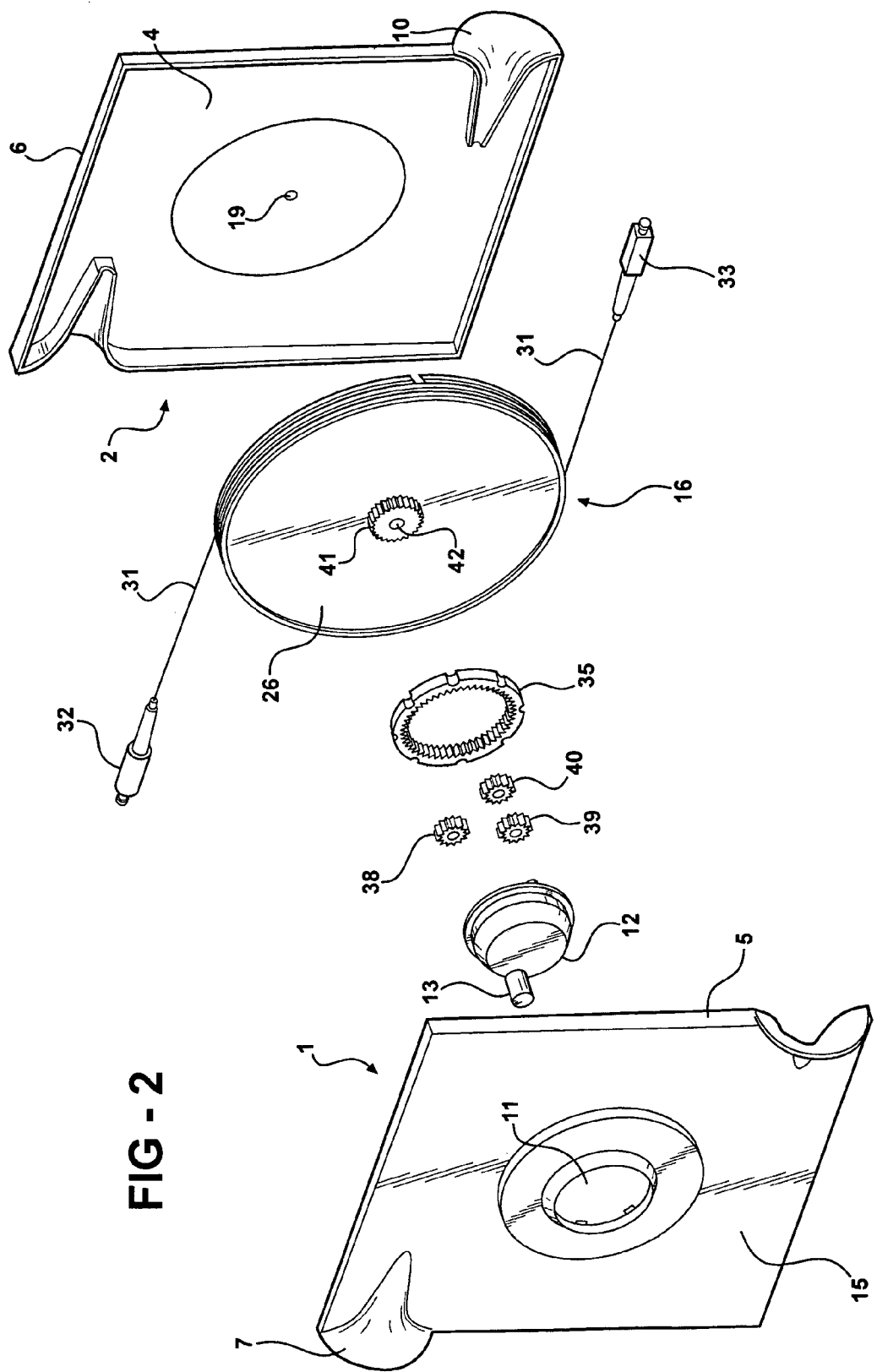

Apparatus constructed in accordance with the presently preferred embodiment of the invention is illustrated in the accompanying drawings wherein:

FIG. 1 is an exploded, isometric view of the apparatus as viewed in one direction; and FIG. 2 is a view similar to FIG. 1, but showing the apparatus as viewed in the opposite direction.

THE PREFERRED EMBODIMENT

A fiber optic protective carrier constructed in accordance with the invention comprises two container halves 1 and 2 which, when fused or welded to one another, form a hollow casing or container having a front wall 3 and a rear wall 4. The casing half 1 has a marginal flange 5 and the casing half 2 has a similar flange 6 engageable with one another when the halves are placed in confronting relation so as to be welded or otherwise secured to one another to form the hollow casing. The casing half 1 is formed with two diagonally spaced inlet portions 7 and 8, and the casing half 2 is provided with similar inlet portions 9 and 10 which, when the casing halves are secured to one another, form inwardly tapering passages through the casing.

The casing half 1 has an opening 11 therein for the accommodation of a cylindrical, rotatable crank body 12 having at one side a crank arm 13 and at the opposite side three circumferentially spaced spindles 14.

The casing half 1 also has a cylindrical cavity 15 therein in which is accommodated a substantially cylindrical rotor 16 having a cylindrical recess 17 in one face thereof. At the center of the recess is a hub 18 which accommodates a stub 19 fixed on the inner face of the back wall 4 of the casing half 2 so as to mount the rotor 16 for rotation about the axis formed by the hub.

Accommodated in the recess 17 is an S-shaped guide 19 for a fiber optic cable 20. The guide comprises a pair of spaced apart, parallel walls 21 secured to the base of the cavity 17. The walls 21 together define a curvilinear guide channel 22 open at both ends. The curvatures of the channel 22 have radii preferably greater than the minimum required to cause attenuation of the signal carried by the cable. The hub 18 spans the channel 22, but does not obstruct the latter. The base of the cavity forms a bottom for the channel.

The rotor 16 includes three axially spaced flanges 24, 25, and 26 which are coupled at their centers by a hub (not shown) as is conventional and which, together, form two axially spaced, annular grooves 27 and 28. The guide channel 22 communicates at one end with two overlying guide slots 29 which extend through the two flanges 24 and 25 and communicate with the groove 28. The opposite end of the channel 22 communicates with a guide slot 30 which extends through the flange 24 and communicates with the annular groove 27. The bases of the slots are inclined, the slots 29 being sloped downwardly to open into the groove 28 and the slot 30 being sloped upwardly to open into the groove 27.

The fiber optic cable 20 has its central portion accommodated in the guide channel 22 and is frictionally retained therein by the guide walls 21. However, the fiber optic cable is not pinched or deformed in any way. From the center of the channel 22 the fiber optic cable extends through both of the guide slots 29 and is convolutely wound manually in the groove 28. One end portion 32 of the cable 31 extends outwardly of the groove 28 substantially tangentially of the rotor 16 and through the opening formed by the cooperating sections 7 and 9 for connection to a termination 32 of known construction.

Similarly, from the central portion of the fiber optic cable 20 the other half of such cable extends through the guide channel 22 on the opposite side of the axis of rotation of the rotor and through the guide slot 30, the base of the channel being upwardly sloped to enable the associated part of the fiber optic cable to enter the groove 27 for manual winding therein. That portion of the cable which extends through the slots 29 and occupies the groove 28 will be at such level that it underlies the cable portion that is convolutely wound in the annular groove 27 formed by the flanges 24 and 25, thereby avoiding conflict between those portions of the cable occupying the grooves 27 and 28. The portion 31a of the cable which extends beyond the rotor 16 is joined to a termination 33.

The guide slots 29 and 30 do not extend radially of the rotor 16, but instead are chordal and parallel to one another. This arrangement makes it possible for that part of the cable which enters the associated grooves 27 and 28 to avoid being bent on such a small radius (known as the minimum bending radius) as to kink or otherwise permanently deform or break the cable.

Transmission means 34 is provided for effecting rotation of the rotor 16 in response to rotation of the crank body 12. The transmission means comprises a ring gear 35 accommodated in an opening 36 in the front wall 3 of the casing half 1. To prevent rotation of the ring gear 35 the wall of the opening and the periphery of the gear are provided with interengaging projections 37 and complementary grooves.

Also forming part of the transmission means and in mesh with the ring gear 35 are three drive gears 38, 39, and 40 mounted on the spindles 14. The gears 38–40 also mesh with a gear 41 mounted on a spindle 42 fixed on the outer face of the rotor flange 26. For convenience and clarity, conventional bearings, bushings, and the like, although present, are not shown in the drawings.

To condition the apparatus for operation, the several gears are assembled with their respective supports, the fiber optic cable 20 is secured at its midpoint within the center portion of the guide channel 22, and the adjacent portions are extended from the channel via the slots 29 and 30 into the grooves 27 and 28. The cable portions are manually wound, sequentially, first in the groove 28 and then in the groove 27. Those parts of the cable on opposite sides of the axis of rotation of the rotor are wound in the respective grooves in the same direction. The end portions 31 and 31a are extended from the respective grooves at positions 180° apart so that the end portions extend from the rotor in opposite directions.

The terminations 32 and 33 are extended to a position in which they project beyond the edges of the casing, and then placed in the openings at the diagonally spaced corners of the casing. The casing parts then are assembled and the two halves secured to one another so as to form an enclosure for the rotary parts of the assembly and the cable. The rotor 16 may be rotated via the crank 13 in such direction as to cause the terminations 32 and 33 to be accommodated in the tapered openings. In these positions of the parts the cable itself and the terminations will be protected from being damaged by dropping, or by someone's stepping on the casing, or in the event some heavy object should be dropped on the casing, or in the event either or both terminations are bent in such manner as to kink or break the joint between the cable and their terminations.

When it is desired to extend the cable the two terminations 32 and 33 may be pulled manually in opposite directions or the rotor may be rotated via the crank so as to effect unwinding of the two portions of the cable on opposite sides of the axis of rotation, thereby enabling the two terminations to span terminals or other points that are to be connected to one another.

To return the cable and terminations to their retracted positions, the crank may simply be rotated in such direction as to rewind the cable portions in the associated grooves of the rotor. The configuration of the guide channel 22 and the positioning of the slots 29 and 30, as well as the angle at which they communicate with the associated rotor grooves, are such that at no time is any part of the cable subjected to a bend of such small radius as to kink or be permanently deformed or broken. Although the minimum radius to which a fiber optic cable may be curved ideally is about ten times the diameter of the cable, the curvatures to which the cable is subjected in the disclosed apparatus may vary from this ideal as long as the minimum radius of bending of the cable is not so small as to kink, deform, or break the cable, or attenuate the signal.

The disclosed embodiment is representative of a presently preferred form of the invention, but is intended to be illustrative rather than definitive thereof. The invention is defined in the claims.

What is claimed is:

1. A protective carrier for a fiber optic cable comprises a casing having a first opening and a second opening at opposite sides of said casing; a rotor mounted in said casing for rotation about an axis, said rotor having two axially spaced annular grooves therein; a fiber optic cable having opposite ends; means securing said cable between said opposite ends to said rotor at said axis for rotation with said rotor; means for rotating said rotor; first guide means extending from said axis to one of said grooves; and second guide means extending from said axis to the other of said grooves, said first and second guide means guiding those portions of said cable on opposite sides of said axis from said axis to said first and second grooves respectively, rotation of said rotor in one direction enabling that portion of said cable on one side of said axis to pass through said first opening and outwardly of said casing and that portion of said cable on the opposite side of said axis to pass through said second opening and outwardly of said casing, rotation of said rotor in the opposite direction enabling said portions of said cable to pass through the respective openings and into said casing.

2. The protective carrier according to claim 1 wherein each said guide means has a portion thereof which is curvilinear and formed on a radius sufficiently large to prevent kinking of said cable.

3. The protective carrier according to claim 1 wherein said rotor includes three axially spaced flanges together forming said annular grooves, and wherein said first guide means includes a channel extending from said axis toward one of said grooves and said second guide means includes a channel extending from said axis toward the other of said grooves.

4. The protective carrier according to claim 3 wherein each said channel includes a base inclined axially at such a degree as to enable the cable portion accommodated in one of said grooves to underlie the cable portion accommodated in the other of said grooves.

5. The protective carrier according to claim 1 wherein said first and second openings occupy positions substantially tangential to said rotor.

6. The protective carrier according to claim 1 wherein both of said portions of said cable are convolutely wound on said rotor in the same direction.

7. The protective carrier according to claim 1 wherein said cable is secured at substantially its midpoint to said rotor.

8. The protective carrier according to claim 1 wherein said cable has opposite end portions which extend from said rotor at positions substantially 180° apart.

9. The protective carrier according to claim 1 wherein said cable has a minimum bending radius and wherein no part of said cable within said casing is subjected to bending about a radius less than said minimum bending radius.

10. A protective carrier for a fiber optic cable comprises a casing having a first opening and a second opening at opposite sides of said casing; a rotor mounted in said casing for rotation about an axis, said rotor having two axially spaced annular grooves therein; a fiber optic cable having opposite ends, one portion of said cable being windable in and unwindable from one of said grooves and another portion of said cable being windable in and unwindable from the other of said grooves; means securing said cable between said opposite ends to said rotor at said axis for rotation with said rotor; means for rotating said rotor; first guide means extending from said axis to one of said grooves; and second guide means extending from said axis to the other of said grooves, said first and second guide means guiding those portions of said cable on opposite sides of said axis from said axis to said first and second grooves respectively, rotation of said rotor in one direction enabling that portion of said cable on one side of said axis to pass through said first opening and outwardly of said casing and that portion of said cable on the opposite side of said axis to pass through said second opening and outwardly of said casing, rotation of said rotor in the opposite direction enabling said portions of said cable to pass through the respective openings and into said casing.

11. The protective carrier according to claim 10 wherein said cable has a minimum bending radius and wherein no part of said cable within said casing is subjected to bending about a radius less than said minimum bending radius.

* * * * *